(12) United States Patent
Kaitani (10) Patent No.: US 6,791,293 B2
(45) Date of Patent: Sep. 14, 2004

(54) SENSORLESS CONTROL DEVICE FOR SYNCHRONOUS ELECTRIC MOTOR

(75) Inventor: Toshiyuki Kaitani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/416,296

(22) PCT Filed: Aug. 27, 2001

(86) PCT No.: PCT/JP01/07308

§ 371 (c)(1),
(2), (4) Date: May 8, 2003

(87) PCT Pub. No.: WO03/019314

PCT Pub. Date: Mar. 6, 2003

(65) Prior Publication Data

US 2004/0056630 A1 Mar. 25, 2004

(51) Int. Cl.$^7$ ............................................. G05B 11/18
(52) U.S. Cl. ..................... 318/592; 318/594; 318/590; 318/611; 318/603
(58) Field of Search ....................... 318/590, 592, 318/594, 600, 601, 603, 611, 615, 618, 700, 705, 806, 811, 609

(56) References Cited

U.S. PATENT DOCUMENTS

| | | | | |
|---|---|---|---|---|
| 4,599,547 A | * | 7/1986 | Ho ............................. | 318/594 |
| 4,625,690 A | * | 12/1986 | Morita ........................ | 123/350 |
| 4,710,865 A | * | 12/1987 | Higomura .................... | 700/63 |
| 4,888,536 A | * | 12/1989 | Sakai et al. .................. | 318/592 |
| 5,216,444 A | * | 6/1993 | Noguchi et al. ............. | 346/136 |
| 5,320,421 A | * | 6/1994 | Kade et al. .................. | 303/162 |
| 5,385,394 A | * | 1/1995 | Leppek et al. ............... | 303/115.2 |
| 5,877,955 A | * | 3/1999 | Struyk ......................... | 700/69 |
| 6,119,261 A | * | 9/2000 | Dang et al. .................. | 714/769 |
| 6,282,461 B1 | * | 8/2001 | Gan et al. .................... | 700/258 |
| 6,434,988 B1 | * | 8/2002 | Suzuki et al. ................ | 72/14.4 |
| 6,483,270 B1 | * | 11/2002 | Miyazaki et al. ............ | 318/700 |

FOREIGN PATENT DOCUMENTS

JP          60-223486          11/1985

OTHER PUBLICATIONS

G. Yang, R. Tomioka, M. Nakano, T. Chin "Position and Speed Sensorless Control of Brush–Less DC Motor Based on an Adaptive Observer", IEE D–113–5 (1993).

T. Takeshita, A. Usul, N. Matsui "Sensorless Salient–Pole PM Synchronous Motor drives in All Speed Ranges", IEE D–120–2 (2000).

* cited by examiner

*Primary Examiner*—Paul Ip
(74) *Attorney, Agent, or Firm*—Sughrue Mion, PLLC (57) ABSTRACT

The invention provides a synchronous motor sensorless controller which drives a synchronous motor without use of a rotational position sensor. The controller has a relative position counter 4 which acquires an estimated position of a magnetic pole from the position-and-speed estimation device simultaneously with resetting a summated value to zero when the reference position signal is input and which starts summation operation; and a speed instruction generator 3 having a position controller 29 which performs position control operation on the basis of a deviation between an instruction value pertaining to the amount of movement from the reference position and a summated value output as a relative position from the relative position counter, the generator outputting a speed instruction. The sensorless controller can position at a predetermined location a synchronous motor not having a position sensor.

4 Claims, 11 Drawing Sheets

STOP OPERATION START TIMING
DECELERATION START TIMING

FIG. 11D

SENSORLESS CONTROL DEVICE FOR SYNCHRONOUS ELECTRIC MOTOR

TECHNICAL FIELD

This invention relates to a sensorless controller of a synchronous motor which performs positioning operation by utilization of a limit switch.

BACKGROUND ART

Many automatic warehouses, transfer machines, and machine tools are constructed so as to position a predetermined object at a predetermined position while a motor is used as a power source. Generally, two limit switches are used for positioning and are arranged in a specific manner; namely, a desired rotational speed is switched to a low rotational speed (e.g., a creep speed) in accordance with a signal output from a first limit switch provided at a deceleration start position, thus decelerating the motor. While the motor is in this decelerated state, the object is transported to a predetermined position. When the object has reached a predetermined position, the rotation of the motor is stopped in accordance with a signal output from the second limit switch provided at a stop operation start position.

Figures 11A, 11B:
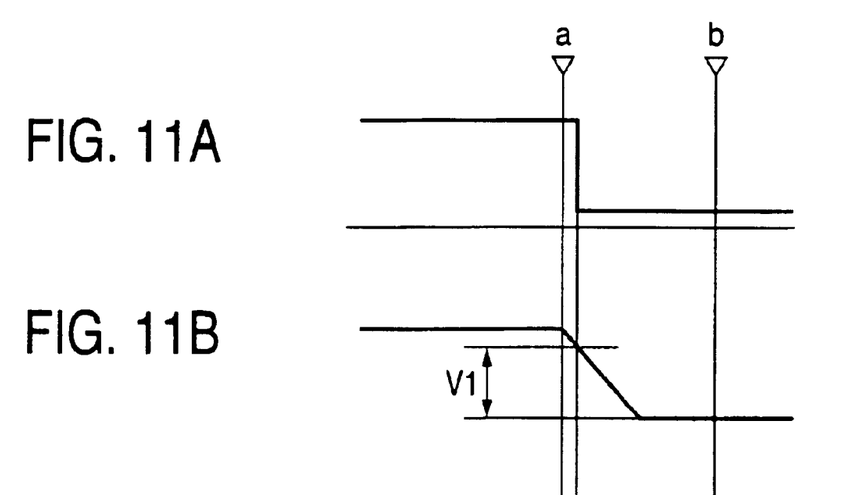
FIG. 11 is a view showing various waveforms produced in conjunction with a simplified positioning method which utilizes a limit switch provided in a deceleration circuit of a related-art motor described in, e.g., JP-A-60-223486.
Figure 11C:
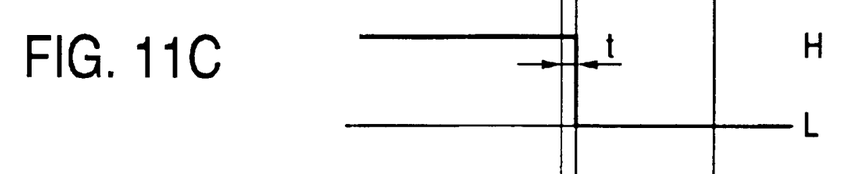
Figure 11D:
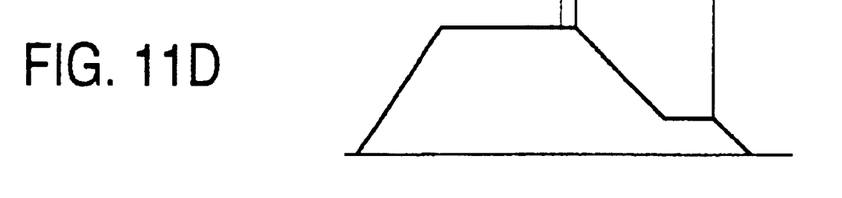

FIG. 11 is a view showing various waveforms produced in conjunction with a simplified positioning method utilizing a limit switch in a deceleration circuit of a related-art motor described in, e.g., JP-A-60-223486. FIG. 11A is a waveform of a target speed; FIG. 11B is a waveform of a voltage output from a charge-and-discharge circuit; FIG. 11C is a waveform of a deceleration timing signal; and FIG. 11D is a waveform of a speed instruction.

In the drawings, reference symbol "a" designates a first limit switch provided at a deceleration start position; "b" designates a second limit switch provided at a stop operation start position; "v1" designates a voltage signal used for determining a deceleration timing; and "t" designates a time which lapses from input of a deceleration instruction until switching of a target rotational speed to a low speed.

Simplified positioning operation utilizing a limit switch provided in a deceleration circuit of a related-art motor will now be described by reference to FIG. 11.

When an object has passed by the first limit switch "a" provided at the deceleration start position while being transported at high speed (or medium speed), the charge-and-discharge circuit performs sequential electrical discharge of an output voltage in accordance with a signal output from the limit switch "a" and with a voltage signal corresponding to a desired rotational speed. When the voltage output from the charge-and-discharge circuit has dropped to a voltage signal v1 (FIG. 11B), a deceleration timing signal changes from H to L (FIG. 11C), thereby switching a target speed from high speed (or medium speed) to low speed (FIG. 11A).

Deceleration operation is started in accordance with a speed instruction at the switching timing of the target speed. When the object has passed by the second limit switch "b" provided at the stop operation start position while being transported at low speed after having completed deceleration, the speed instruction is set to 0, thus halting rotation of the motor (FIG. 11D).

A sensorless controller which controls an induction motor whose actual position information is unknown for reasons of "slippage" of the motor generally performs the above-described simplified positioning operation involving usage of the limit switch.

In contrast, a permanent magnet synchronous motor—which is more efficient, smaller, and easier to control than an induction motor and has become prevalent in the industry—requires current control corresponding to the position of a rotor for controlling torque. Since a position sensor, such as an encoder or resolver, is usually used, positioning of the synchronous motor is usually controlled by use of the position sensor.

If the position sensor can be removed, realization of a more compact, lighter-weight, and less-expensive motor and improvements in environment resistance and reliability can be achieved. Hence, research on various sensorless control of position is pursued.

JP-T-8-505996 describes a method for controlling an observer base of a permanent magnet synchronous motor as an example of related-art position-sensor-less control operation. Under this method, the position and speed of a rotor of a multi-phase brushless permanent magnet synchronous motor are controlled with high resolution. The values of position and speed of the rotor estimated by use of a measured stator phase current are used for desired adjustment of the position or speed of the rotor. Alternatively, the amount of voltage to be applied to respective stator phases is determined for issuing an instruction to the rotor such that the rotor follows a desired trace of position or speed.

Estimation of a position of the rotor to be performed in the case of sensorless control of the synchronous motor is for detecting the position of the motor within a cycle of electrical angle; that is, the position of a magnetic pole. Since the mechanical position of a shaft of the motor (i.e., a mechanical angle of the motor) is unknown (e.g., an electrical angle of a four-pole motor rotates twice within one cycle of the motor; that is, one cycle of a mechanical angle), controlling a mechanical position requires use of a contrivance. Moreover, when a synchronous motor is subjected to sensorless control, positions of magnetic poles are estimated by means of an electrical current flowing through the motor. Hence, when flow of an electric current is interrupted by stopping operation of a drive circuit when the motor is nonoperational, positions of magnetic poles cannot be estimated. If the shaft of the motor is rotated in this situation, there will arise a problem of positions of the magnetic poles being lost.

As mentioned above, sensorless positional control of the synchronous motor is difficult, and driving of a sensorless synchronous motor is usually employed for controlling a speed.

[Problems that the Invention is to Solve]

As mentioned above, the simplified positioning that is commonly employed by an induction motor and uses a limit switch requires two limit switches; that is, a limit switch to be used for starting deceleration operation, and another limit switch to be used for stopping operation. Moreover, the simplified positioning also presents a problem of complicated operation, such as positional adjustment of limit switches.

When a synchronous motor is to perform positioning control operation, the motor must be equipped with position sensors, thus adding to cost.

The invention has been conceived to solve such a problem, and a first object of the invention is to obtain a sensorless controller of a synchronous motor which positions a synchronous motor at a desired location without use of a sensor.

A second object of the invention is to obtain a sensorless controller of a synchronous motor which enables a reduction in the number of limit switches to be provided and facilitates adjustment of setting of the limit switches.

DISCLOSURE OF THE INVENTION

A synchronous motor sensorless controller of the invention includes a current sensor for detecting an electric current of a synchronous motor, a position-and-speed estimation device for computing an estimated speed of the synchronous motor and an estimated position of a magnetic pole through use of the current output from the current sensor, and a speed controller for controlling speed of the synchronous motor through use of a speed instruction and the estimated speed; and drives the synchronous motor without use of a rotational position sensor. The controller comprises reference position signal output means for outputting a reference position signal serving as a standard for positioning counting operation; a relative position counter which acquires an estimated position of a magnetic pole from the position-and-speed estimation device as a reference position simultaneously with resetting a summated value to zero when the reference position signal is input and which starts summation operation; and a speed instruction generator having a position controller which performs position control operation on the basis of a deviation between an instruction value pertaining to the amount of movement from the reference position and a summated value output as a relative position from the relative position counter, the generator outputting a speed instruction. Therefore, a synchronous motor not having a position sensor can be positioned at a predetermined location. Further, there can be obtained a sensorless controller of a synchronous motor which enables a reduction in the number of limit switches to be placed and facilitates adjustment of setting of limit switches.

The speed instruction generator is arranged to enable setting of a deceleration start position and a stop operation start position, start deceleration operation when a summated value output as a relative position from the relative position counter has reached the deceleration start position, and start stop operation when the summated value has reached the stop operation start position. Therefore, two limit switches; that is, a limit switch to be used for starting deceleration operation and another limit switch to be used for starting stop operation, both having hitherto been required to control positioning operation, can be embodied as a single limit switch. Moreover, a stop position can be readily adjusted by changing the deceleration start position or the stop operation start position. Consequently, a complicated operation, such as adjustment of a stop position by re-setting of limit switches which would have hitherto been required, can be obviated.

Further, the speed instruction generator can set at least two pairs, each pair formed from a deceleration start position and a stop operation start position, enables selection of one to be used during operation from the deceleration start position and the stop operation start position, starts deceleration when a summated value output as a relative position from the relative position counter has reached a selected deceleration start position, and starts stop operation when the summated value has reached a selected stop operation start position. Therefore, positioning can be performed in two or more types of patterns without involvement of an increase in the number of limit switches. Further, an operation for adjusting limit switches or changing the deceleration start position is obviated even at the time of switching of a positioning pattern.

In addition, a synchronous motor sensorless controller includes a current sensor for detecting an electric current of a synchronous motor, a position-and-speed estimation device for computing an estimated speed of the synchronous motor and an estimated position of a magnetic pole through use of the current output from the current sensor, and a speed controller for controlling speed of the synchronous motor through use of a speed instruction and the estimated speed; and drives the synchronous motor without use of a rotational position sensor. The controller comprises reference position signal output means for outputting a reference position signal serving as a standard for positioning counting operation; a relative position counter which acquires an estimated position of a magnetic pole from the position-and-speed estimation device simultaneously with resetting a summated value to zero when the reference position signal is input and which starts summation operation; speed instruction change position signal output means for outputting a speed instruction change position signal; and a speed instruction generator having a position controller which performs position control operation on the basis of a deviation between an instruction value pertaining to the amount of movement from the reference position and a summated value output as a relative position from the relative position counter, the generator outputting a speed instruction. Therefore, a synchronous motor not having a position sensor can be positioned at a predetermined location.

Further, the speed instruction generator enables setting of a deceleration start position, starts deceleration operation when a summated value output as a relative position from the relative position counter has reached the deceleration start position, and starts stop operation when the summated value has reached the stop operation start position. The accuracy of stoppage of a synchronous motor not having a position sensor at a predetermined location can be improved further by outputting a reference position signal during low speed operation.

The speed instruction generator enables setting of a deceleration start position, a first operation change relative position, and a second operation change relative position; changes a speed instruction when a summated value output as a relative position from the relative position counter has reached the first operation change relative position or the second operation change relative position; starts deceleration when a summated value output from the relative position counter as a relative position has reached the deceleration start position; and starts stop operation when a speed instruction change position signal is outputted from the speed instruction change position signal output means. Therefore, a synchronous motor not having a position sensor can be positioned at a predetermined location, and the speed of the motor is changed during the course of operation over a distance between the first operation change relative position and the second operation change relative position, whereby the distance can be used for inspection or the like.

BEST MODES FOR CARRYING OUT THE INVENTION

First Embodiment

Figure 1:
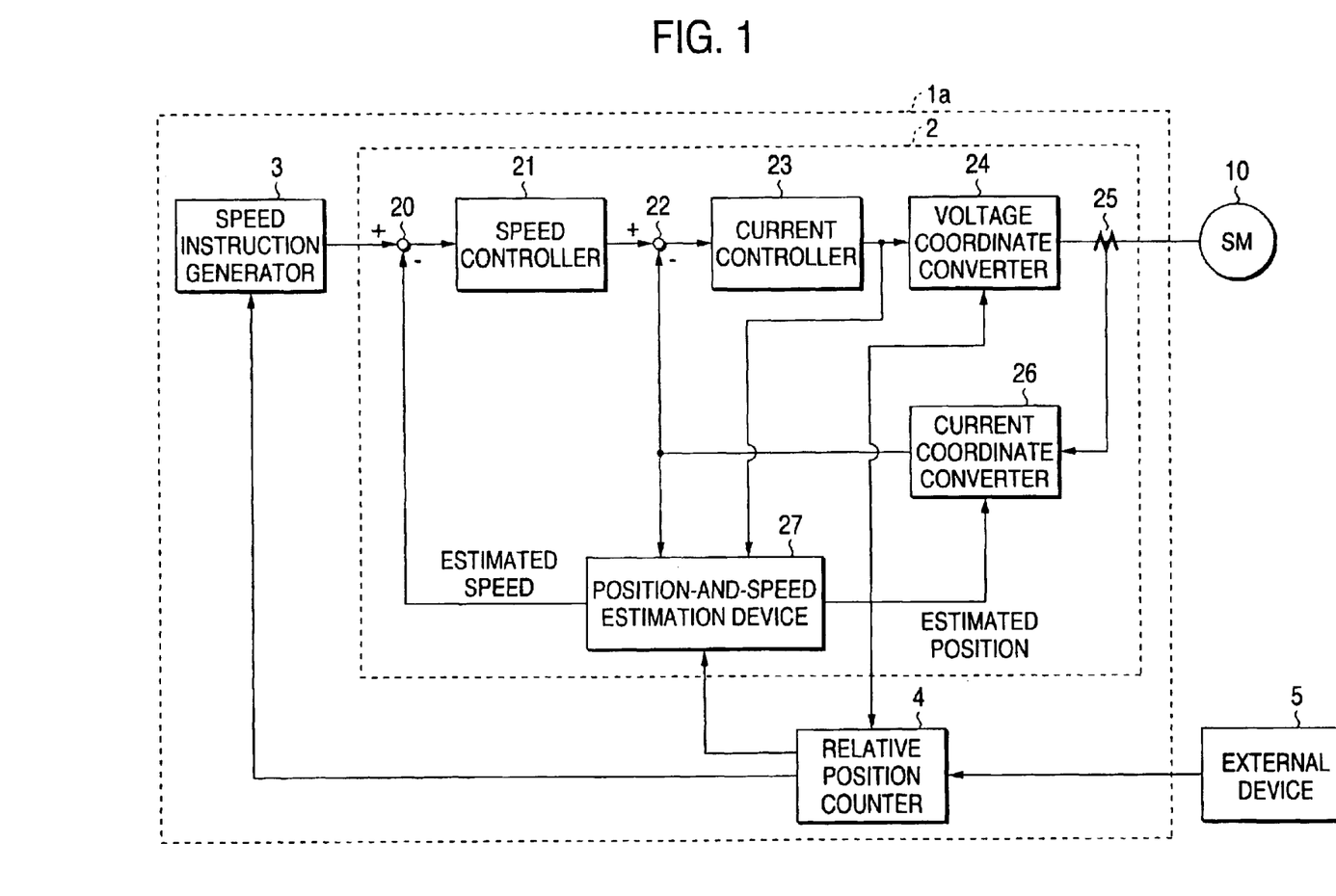
FIG. 1 is a view showing the configuration of a sensorless controller 1a of a synchronous motor according to a first embodiment of the invention.

FIG. 1 is a view showing the configuration of a sensorless controller 1a of a synchronous motor according to a first embodiment of the invention. In the drawing, reference numeral 1a designates a sensorless controller of a synchronous motor; 2 designates a sensorless speed control section; 3 designates a speed instruction generator; 4 designates a relative position counter; 5 designates an external device serving as reference position signal output means, the means outputting a reference position signal serving as a standard for a positioning count; and 10 designates a synchronous motor.

Further, reference numeral 20 designates a subtracter for computing a difference between a speed instruction output from the speed instruction generator 3 and an estimated speed output from a position-and-speed estimation device 27 to be described later; 21 designates a speed controller for outputting a current instruction in accordance with an output from the subtracter 20; 22 designates a subtracter for computing a difference between a current instruction output from the speed controller 21 and the output from a current coordinate converter 26 to be described later; 23 designates a current controller outputting a voltage in accordance with an output from the subtracter 22; 24 designates a voltage coordinate converter for converting an output from the current controller 23 into a voltage to be applied to the synchronous motor 10 through coordinate conversion; 25 designates a current sensor; 26 designates a current coordinate converter for converting an output current detected by the current sensor 25 into coordinates; and 27 designates a position-and-speed estimation device for estimating the position and speed of the synchronous motor 10 through use of the current output from the current coordinate converter 20 and the voltage output from the current controller 23.

The sensorless speed control section 2 is basically identical in configuration with a method for controlling a synchronous motor without use of a sensor, the motor being operative over an entire speed range, which is proposed as, e.g., "CONTROL OF SENSORLESS SALIENT-POLE PM SYNCHRONOUS MOTOR OVER ENTIRE SPEED RANGE," pp. 240 to 247, No. 2, Vol. 120, Transactions D of The Institute of Electrical Engineers of Japan, 2000 or a method proposed as, e.g., "SENSORLESS CONTROL OF POSITION OF BRUSHLESS DC MOTOR USING ADAPTIVE OBSERVER," pp. 579 to 586, Vol. 113, Transactions D of The Institute of Electrical Engineers of Japan, 1993.

Operation of the sensorless speed control section 2 will now be described.

The subtracter 20 computes a difference between a speed instruction output from the speed instruction generator 3 and an estimated speed output from the position-and-speed estimation device 27.

The speed controller 21 computes and outputs a current instruction on the basis of a speed deviation signal which is generated by, e.g., a proportional element and an integral element and is output from the subtracter 20.

The subtracter 22 computes a difference between a current instruction output from the speed controller 21 and a current value output from the current coordinate converter 26.

The current controller 23 computes and outputs a voltage instruction on the basis of a current deviation signal which is generated by, e.g., a proportional element and an integral element and is output from the subtracter 22.

The voltage coordinate converter 24 converts a voltage instruction output from the current controller 23 into a voltage to be applied to the synchronous motor 10 through use of an estimated position output from the position-and-speed estimation device 27.

The current coordinate converter 26 converts a current of the synchronous motor 10 into coordinates through use of an estimated position output from the position-and-speed estimation device 27.

The position-and-speed estimation device 27 estimates the position and speed of the synchronous motor 10 from a voltage output from the current controller 23 and a current output from the current coordinate converter 26.

In the sensorless controller 1a of the synchronous motor of the first embodiment, the sensorless speed control section 2 is connected to the relative position counter 4, and the position-and-speed estimation device 27 estimates the position of a magnetic pole obtained when a reference position signal is input from the external device 5 (i.e., information about an electrical angle of the motor). The thus-estimated position value is output to the relative position counter 4 as a magnetic pole position serving as a standard. The estimated position value is output to the relative position counter 4 every time a magnetic pole passes by the magnetic pole position serving as a standard.

Figure 2:
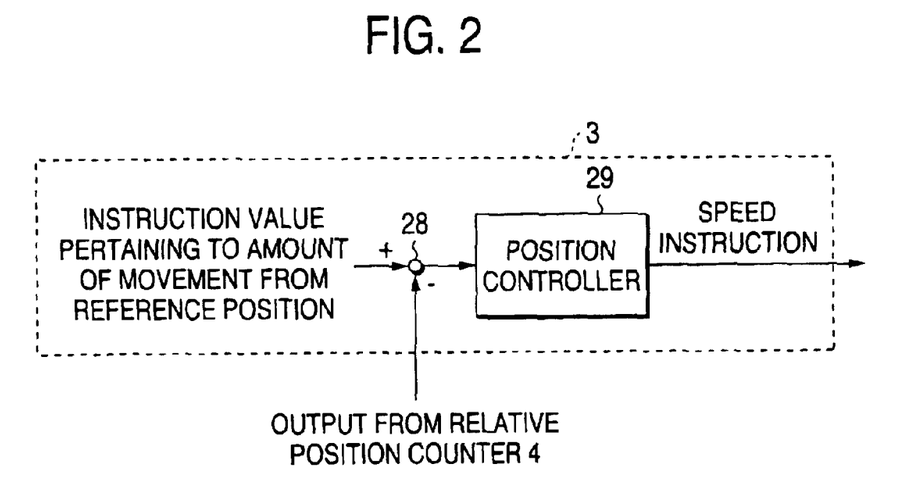
FIG. 2 is a view showing the configuration of a speed instruction generator 3 provided in the sensorless controller 1a of the synchronous motor according to the first embodiment of the invention.

FIG. 2 is a view showing the configuration of the speed instruction generator 3 provided in the sensorless controller 1a of a synchronous motor according to the first embodiment of the invention. In the illustration, reference numeral 28 designates a subtracter for computing a difference between an instructed amount of movement from the reference position and a position relative to the standard position output from the relative position counter 4; and 29 designates a position controller.

By reference to FIGS. 1 and 2, operation of the sensorless controller 1a of the synchronous motor of the first embodiment will now be described. The sensorless controller 1a of the synchronous motor that does not use any sensor for sensing an absolute position computes an absolute position by determining a position relative to a reference position while the position of a magnetic pole obtained when a reference position signal is input is taken as a reference position.

When the reference position signal is input from the external device 5, the relative position counter 4 resets a total value to zero. Simultaneously, the relative position counter 4 starts summation of position values of a magnetic pole while the position of the magnetic pole obtained when a reference position signal has been input is input as a reference position from the sensorless speed control section 2.

The relative position counter 4 determines a position relative to the reference position, by means of adding up a value counted every time the magnetic pole passes by a magnetic pole position serving as a standard for counting and the amount of displacement from a reference position for a magnetic pole within one cycle of an electrical angle.

The speed instruction generator 3 is arranged such that the position controller 29 prepares a speed instruction on the basis of a difference between an instructed amount of movement from the reference position determined by the subtracter 28 and a position relative to the reference position output from the relative position counter 4. The speed instruction generator 3 can change a speed instruction in accordance with information about the relative position output from the relative position counter 4, thereby enabling position control operation.

In the sensorless controller 1a of the synchronous motor of the first embodiment, the relative position counter 4 adds up a value counted every time a magnetic pole passes by a magnetic pole position serving as a reference and the amount of displacement from the reference position for a magnetic pole within one cycle of an electrical angle, thereby determining a position relative to the reference position. Hence, a synchronous motor not having a position sensor can stop an object at a position relative to the reference position. Further, a position sensor has hitherto been used when a synchronous motor performs positioning operation. However, a synchronous motor can perform positioning operation without use of a position sensor, thereby curtailing cost of a system while improving reliability.

Second Embodiment

Figure 3:
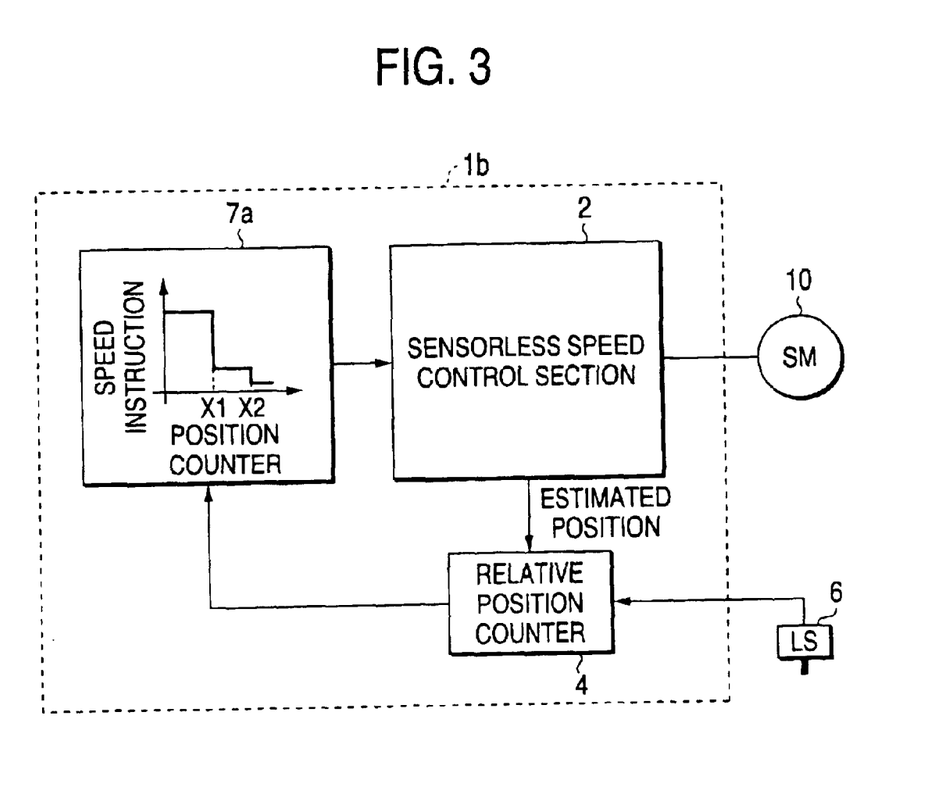
FIG. 3 is a view showing the configuration of a sensorless controller 1b of a synchronous motor according to a second embodiment of the invention.

FIG. 3 is a view showing the configuration of a sensorless controller 1b of a synchronous motor according to a second embodiment of the invention. In the drawing, reference numerals 2, 4, and 10 designate those elements which are identical with those shown in FIG. 1, and their repeated explanations are omitted. Reference numeral 1b designates a sensorless controller of a synchronous motor; 6 designates a limit switch which outputs a reference position signal to the relative position counter 4; and 7a designates a speed instruction generator for changing a speed instruction in accordance with an output from the relative position counter 4. Further, reference symbols X1, X2 designate reference values set in advance for the speed instruction generator 7a. Here, X1 corresponds to the first limit switch "a" provided at the deceleration start position in FIG. 11 and designates a distance between a position at which the limit switch 6 is to output a reference position signal and the deceleration start position. X2 designates corresponds to the second limit switch "b" provided at the stop operation start position shown in FIG. 11 and designates a distance between a position at which the limit switch 6 is to output a reference position signal and the stop operation start position.

FIG. 4 is a view for describing operation of the sensorless controller 1b of the synchronous motor according to the second embodiment of the invention. FIG. 4A shows an example configuration of a transfer apparatus; FIG. 4B shows a speed instruction output from the speed instruction generator 7a; FIG. 4C shows an output from the relative position counter 4; and FIG. 4D designates a speed. In the drawing, reference numeral 1b designates a sensorless controller of a synchronous motor capable of inputting a signal output from the limit switch 6; 10 designates a synchronous motor; 11 designates a shaft of the synchronous motor; 12 designates a belt which is connected to the shaft 11 of the synchronous motor and is actuated; 13 designates an object which is transported while being secured to the belt; and 14a designates a stopper.

Operation of the sensorless controller 1b of the synchronous motor of the second embodiment will now be described by reference to FIGS. 3 and 4.

Figure 4A:
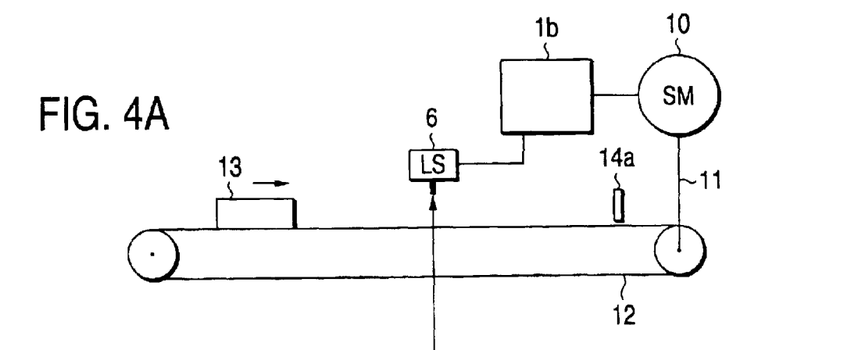
FIG. 4 is a view for describing operation of the sensorless controller 1b of the synchronous motor according to the second embodiment of the invention.

When the object 13 passes by the limit switch 6 while being transported in a rightward direction from the left end of FIG. 4A, the limit switch 6 outputs a reference position signal.

Upon receipt of a reference position signal output from the limit switch 6, the relative position counter 4 resets a total value to zero. Simultaneously, the relative position counter 4 starts summation of position values of a magnetic pole while the position of the magnetic pole obtained when a reference position signal has been input is input as a reference position from the sensorless speed control section 2.

The relative position counter 4 determines a position relative to the reference position, by means of adding up a value counted every time the magnetic pole passes by a magnetic pole position serving as a standard for counting and the amount of displacement from a reference position for a magnetic pole within one cycle of an electrical angle. A value summated by the relative position counter 4 increases in a manner shown in FIG. 4C.

Figure 4B:
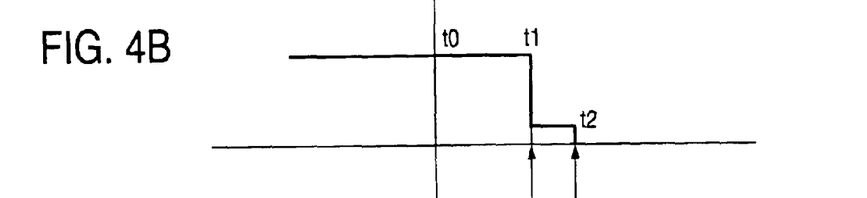
Figure 4C:
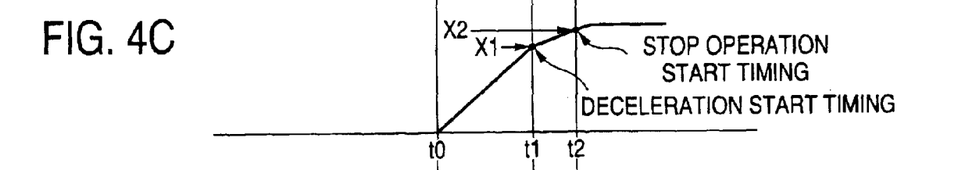

When the value counted by the relative position counter 4 has reached a previously-set deceleration start position X1 as shown in FIG. 4C, the speed instruction generator 7a starts deceleration operation by changing the speed instruction as shown in FIG. 4B. Further, when the value counted by the relative position counter 4 has reached the stop operation start position X2, the speed instruction generator 7a commences a stop operation and changes the speed instruction.

Figure 4D:
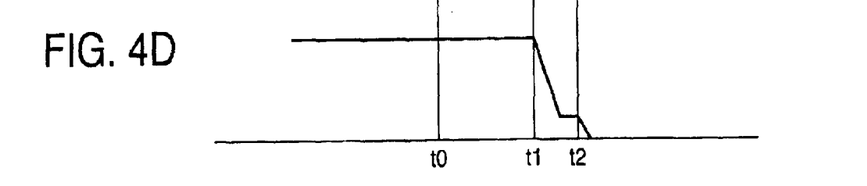

As shown in FIG. 4D, changes appear in travel speed of the object 13 such that the object 13 passes by the limit switch 6 (t0), such that deceleration is commenced when the value counted by the relative position counter 4 has reached the deceleration start position X1 (t1), and such that stop operation is started (t2) when the value counted by the relative position counter 4 has reached the stop operation start position X2.

In the sensorless controller 1b of the synchronous motor of the second embodiment, the deceleration start position X1 and the stop operation start position X2 are set in advance. When the object has passed by the limit switch 6 or when the value counted by the relative position counter 4 that has started counting operation has reached the deceleration start position X1, deceleration operation is started. When the counted value has reached the stop operation start position X2, stop operation is commenced. Hence, a deceleration start limit switch and a stop operation start limit switch, both being required to perform positioning control, can assume the form of a single limit switch. A reduction in the number of limit switches leads to a reduction in length of a wire extending from the limit switch to the controller, thereby further facilitating wiring operation.

A stop position can be readily adjusted by changing the deceleration start position X1 and the stop operation start position X2. Hence, there can be obviated a complicated operation, such as adjustment of a stop position being performed by re-setting limit switches, which would otherwise be required.

Third Embodiment

Figure 5:
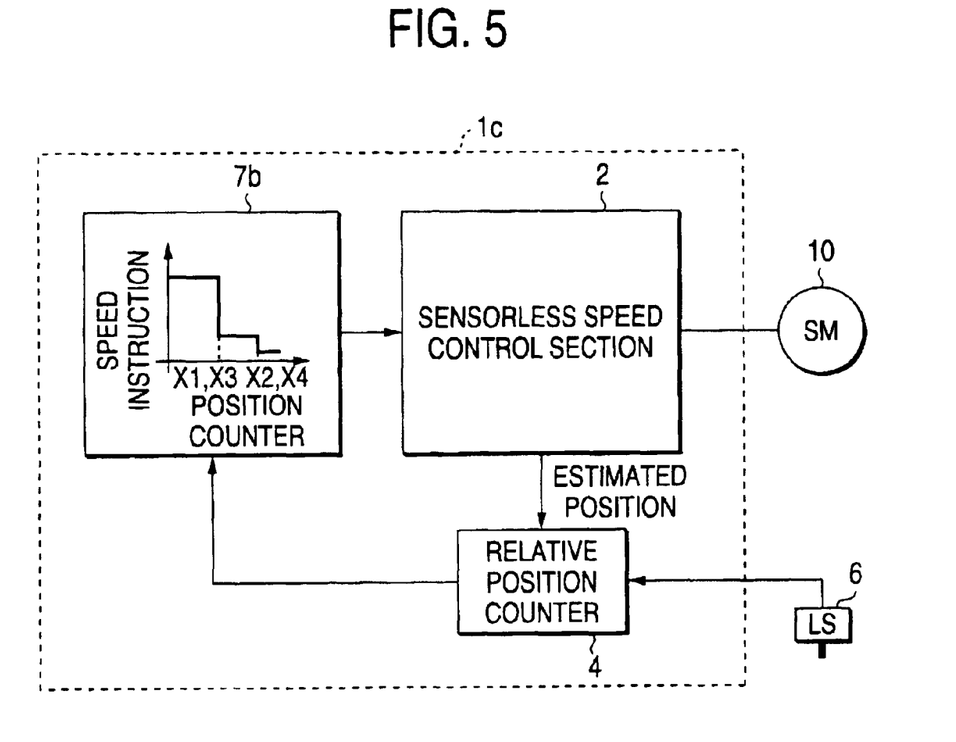
FIG. 5 is a view showing the configuration of a sensorless controller 1c of a synchronous motor according to a third embodiment of the invention.

FIG. 5 is a view showing the configuration of a sensorless controller 1c of a synchronous motor according to a third embodiment of the invention. In the drawing, reference numerals 2, 4, and 10 designate elements which are identical with those shown in FIG. 1, and their repeated explanations are omitted. Reference numeral 1c designates a sensorless controller of a synchronous motor; 6 designates a limit switch which outputs a reference position signal to the relative position counter 4; and 7b designates a speed instruction generator for changing a speed instruction in accordance with an output from the relative position counter 4. Reference symbols X1, X2, X3, and X4 designate reference values set in advance on the speed instruction generator 7b. Here, X1 designates a deceleration start position for normal operation; X2 designates a stop operation start position for normal operation; X3 designates a deceleration start position for reverse rotation; and X4 designates a stop operation start position for reverse rotation.

FIG. 6 is a view for describing operations of the sensorless controller 1c of the synchronous motor of the third embodiment of the invention, the operations differing because of a difference in rotational direction.

Figure 6A:
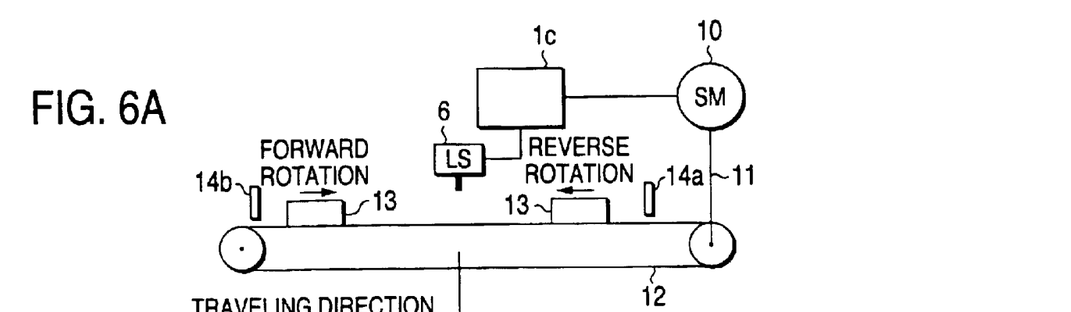
FIG. 6 is a view for describing operations of the sensorless controller 1c of the synchronous motor of the third embodiment of the invention, the operations differing because of a difference in rotational direction.
Figure 6B:
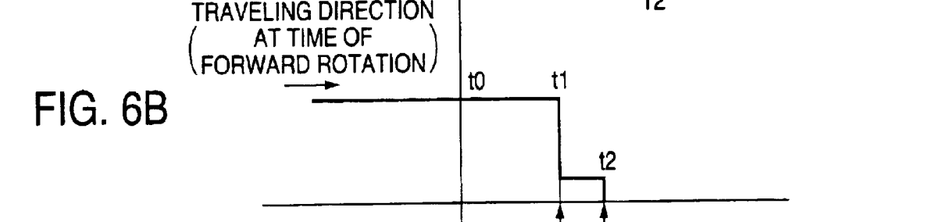
Figure 6C:
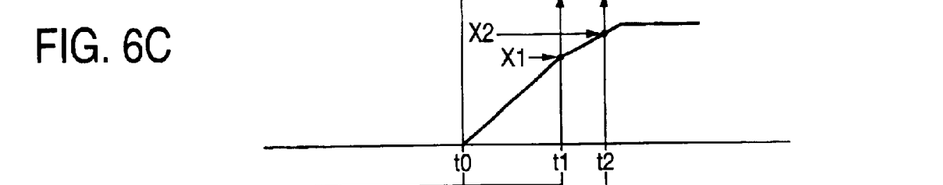
Figure 6D:
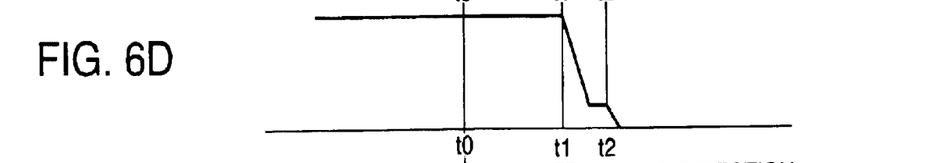
Figure 6E:
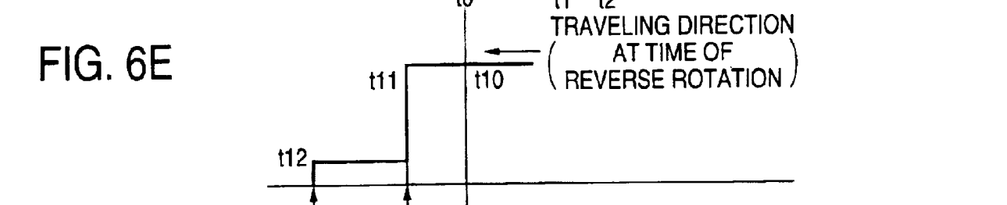
Figure 6F:
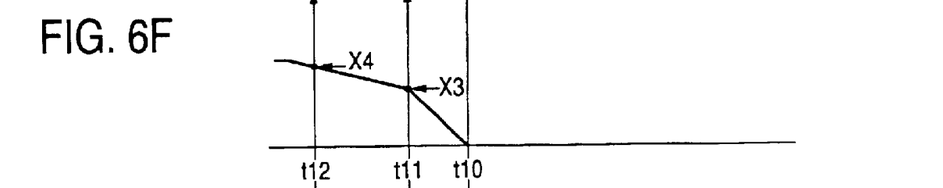
Figure 6G:
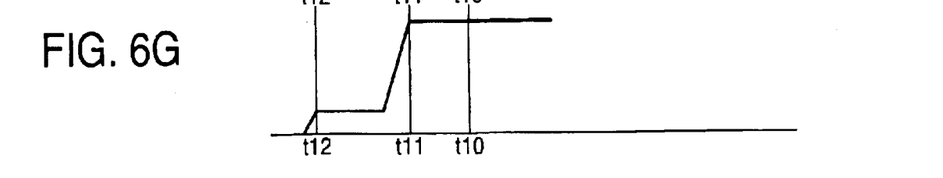

FIG. 6A shows an example configuration of a transfer apparatus; FIG. 6B shows a speed instruction to be issued during forward rotation; FIG. 6C shows an output from the relative position counter 4 during forward rotation; FIG. 6D designates a speed achieved during forward rotation; FIG. 6E designates a speed instruction issued during reverse rotation; FIG. 6F designates an output from the relative position counter 4 during reverse rotation; and FIG. 6G designates a speed achieved during reverse rotation. In the drawings, reference numerals 14a, 14b designate stoppers.

The following description is provided while movement of an object from left to right in the drawing is taken as forward rotation operation and movement of the same from right to left in the drawing is taken as reverse rotation operation.

During forward rotation operation, the speed instruction generator 7b starts deceleration by changing a speed instruction when the value counted by the relative position counter 4 has reached the previously-set deceleration start position X1 (t1). The speed instruction generator 7b commences a stop operation and changes the speed instruction when the counted value has reached the stop operation start position X2 (t2). During reverse rotation operation, when the value counted by the relative position counter 4 has reached a previously-set deceleration start position X3 (t11), the speed instruction generator 7b starts deceleration by changing the speed instruction. When the counted value has reached the stop operation start position X4 (t12), the speed instruction generator 11b commences a stop operation and changes the speed instruction.

FIG. 4 of the second embodiment shows an example in which deceleration is started when the output from the relative position counter 4 has reached the deceleration start position X1 and in which stop operation is started when the output has reached the stop operation start position X2. However, when positioning is performed by changing a traveling direction (e.g., when positioning to be performed during forward rotation operation is changed to positioning to be performed during reverse rotation operation), an operation for adjusting the position of a limit switch for forward rotation operation and for reverse rotation operation or an operation for changing the deceleration start position X1 and the stop operation start position X2 is required. Moreover, when positioning is performed for forward rotation operation and for reverse rotation operation, a limit switch for forward rotation operation and another limit switch for reverse rotation operation are required. Moreover, depending on a traveling direction, a determination must be rendered as to whether one of the limit switches is valid or invalid and whether the remaining limit switch is invalid or valid.

However, the sensorless controller 1c of the synchronous motor of the third embodiment is provided with the deceleration start position X1 and the stop operation start position X2 for forward rotation operation, and the deceleration start position X3 and the stop operation start position X4 for reverse rotation operation. The deceleration start position and the stop operation start position can be individually set for forward rotation operation and reverse rotation operation. Hence, positioning for forward rotation operation and positioning for reverse rotation operation can be carried out without involvement of an increase in the number of limit switches. Even when a traveling direction for positioning is switched (when positioning to be performed for forward rotation operation is switched to positioning to be performed for reverse rotation operation or vice versa), operation for adjusting limit switches or operation for changing the deceleration start positions X1, X2 is obviated.

The foregoing description has described an example in which two pairs of reference values to be previously set for the speed instruction generator 7b are determined as the deceleration start position X1 and the stop operation start position X2 for forward rotation operation and as the deceleration start position X3 and the stop operation start position X4 for reverse rotation operation. A determination is made as to whether operation is forward rotation or reverse rotation. At the time of forward rotation operation, the deceleration start position X1 and the stop operation start position X2 are used. At the time of reverse rotation operation, the deceleration start position X3 and the stop operation start position X4 are employed. A deceleration start position and a stop operation start position, which are to be used during operation, may be selected during the course of movement of an object in a single direction.

Fourth Embodiment

Figure 7:
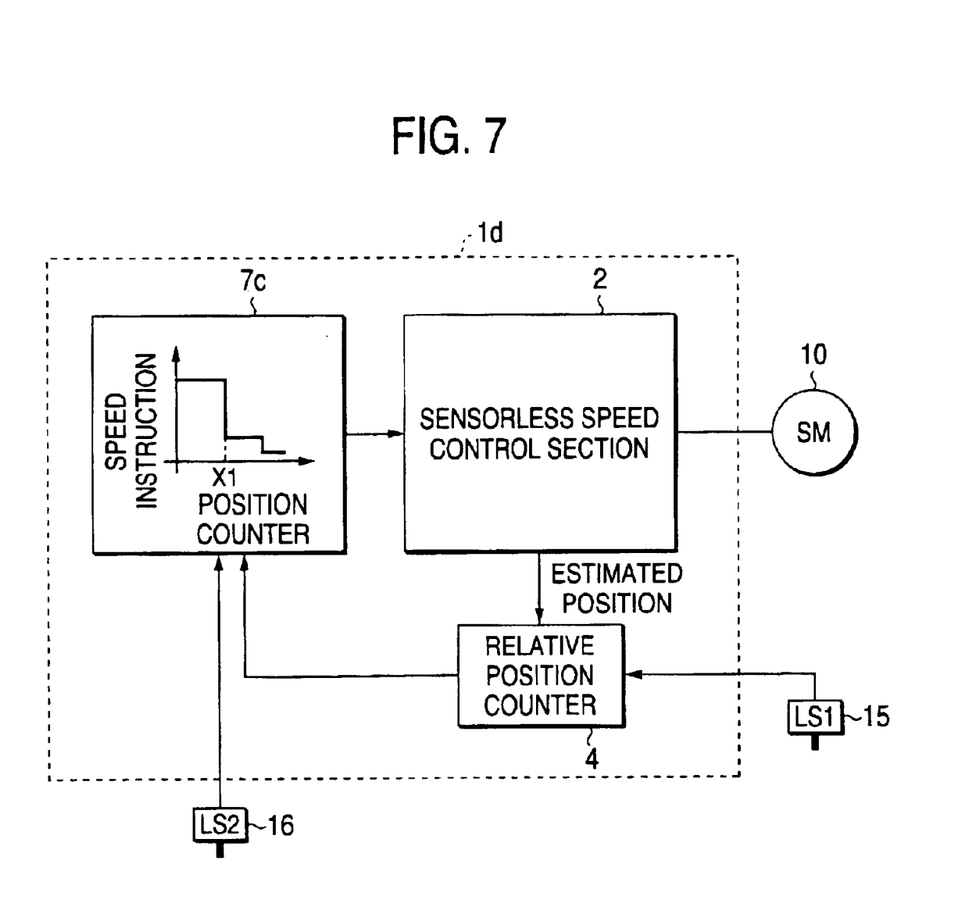
FIG. 7 is a view showing the configuration of a sensorless controller 1d of a synchronous motor according to a fourth embodiment of the invention.

FIG. 7 is a view showing the configuration of a sensorless controller 1d of a synchronous motor according to a fourth embodiment of the invention. In the drawing, reference numerals 2, 4, and 10 designate elements which are identical with those shown in FIG. 1, and their repeated explanations are omitted. Reference numeral 1d designates a sensorless controller of a synchronous motor; 7c designates a speed instruction generator for changing a speed instruction in accordance with an output from the relative position counter 4; 15 designates a limit switch which outputs a reference position signal to the relative position counter 4; and 16 designates a limit switch for starting stop operation. Here, X1 designates a reference value which is previously set on the speed instruction generator 7c and corresponds to a distance from a location at which the limit switch 15 is to output a reference position signal to the deceleration start position.

Figure 8A:
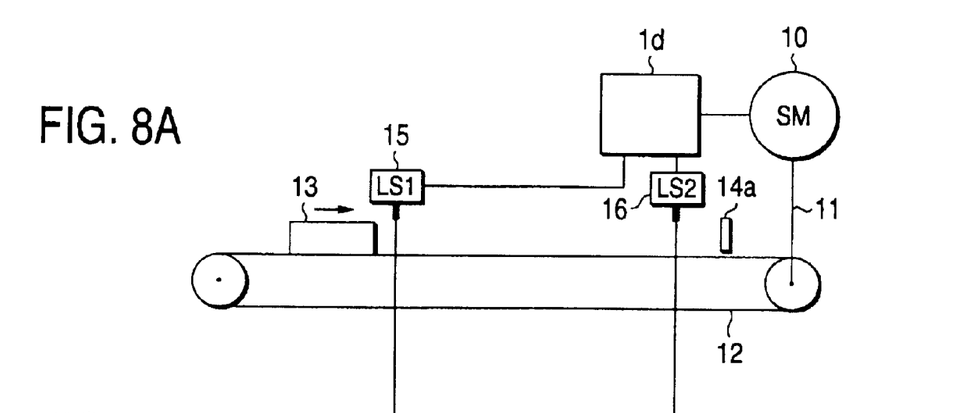
FIG. 8 is a view for describing the operation of the sensorless controller 1d of the synchronous motor of the fourth embodiment of the invention.
Figure 8B:
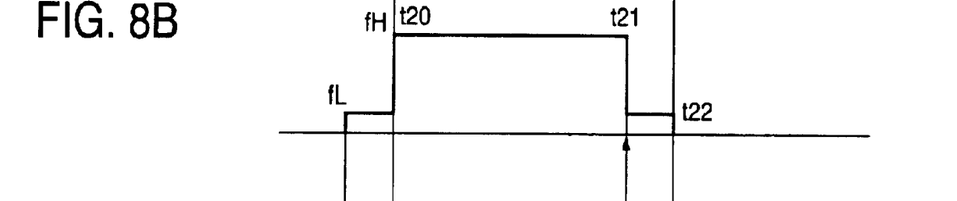
Figures 8C, 8D:
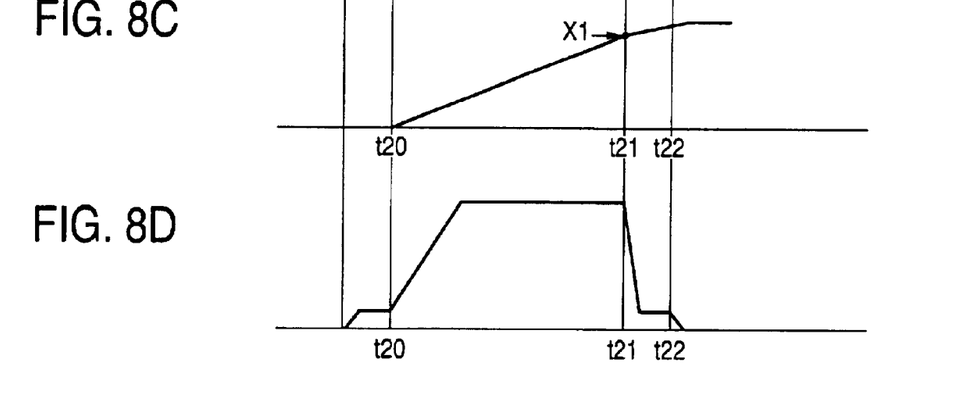

FIG. 8 is a view for describing the operation of the sensorless controller 1d of the synchronous motor of the fourth embodiment of the invention. FIG. 8A shows an example configuration of a transfer apparatus; FIG. 8B shows a speed instruction; FIG. 8C shows an output from the relative position counter 4; and FIG. 8D shows a speed.

In the drawing, reference numerals 10 through 13 and 14a designate elements which are identical with those shown in FIG. 4, and their repeated explanations are omitted. Reference numeral 1d designates a sensorless controller of a synchronous motor; 15 designates a limit switch which outputs a reference position signal to the relative position counter 4; and 16 designates a stop operation start limit switch.

Operation of the sensorless controller 1d of the synchronous motor according to the fourth embodiment will now be described by reference to FIGS. 7 and 8.

When the synchronous motor is started up, the object 13 is moved rightward from the left end of FIG. 8A in accordance with a low speed instruction $f_L$.

At a point in time (t20) when the object 13 passes by the limit switch 15 during low speed operation, the relative position counter 4 is reset, thereby starting counting operation. Moreover, at the point in time (t20) when the object 13 passes by the limit switch 15, the speed instruction generator 7c switches the instruction to a high speed instruction $f_H$.

When the value counted by the relative position counter 4 has reached the deceleration start position X1 during high speed operation (t21), the speed instruction generator 7c switches the speed instruction to the low speed instruction $f_L$.

Deceleration is commenced, and at a point in time (t22) when the object passes by the limit switch 16 while traveling at a predetermined low rotational speed, stop operation is started.

The second embodiment has described an embodiment in which the relative position counter 4 receives an output from the limit switch 6 as a reference position signal during high speed operation, thereby starting counting operation, in which, when a counted value has reached the deceleration start position X1, the speed instruction generator 7a starts deceleration operation, and in which, when the counted value has reached the stop operation start position X2, a stop operation is started. The fourth embodiment is arranged such that the relative position counter 4 receives an output from the limit switch 15 as a reference position signal during a low speed operation, thereby starting counting operation. When a counted value has reached the deceleration start position X1, the speed instruction generator 7c starts deceleration operation. At a point in time when the object has passed by the stop operation start limit switch 16, stop operation is started.

In the fourth embodiment, a signal output from the limit switch 15 is read during a low speed operation, and hence occurrence of an error in deceleration start position, which would otherwise be caused by a delay in latching a signal, can be suppressed. Moreover, the object passes by the stop operation start limit switch 16 during low speed operation, and hence the accuracy of stoppage can be improved further.

The forgoing embodiment has described an example in which the deceleration start position X1 is used as an amount of movement to be set previously. Alternatively, the amount of movement to be used for effecting the switch from low speed operation to high speed operation and the amount of movement to be used for starting stopping operation may also be set and used in operation which would be performed when the object passes by the limit switches 15, 16.

Fifth Embodiment

Figure 9:
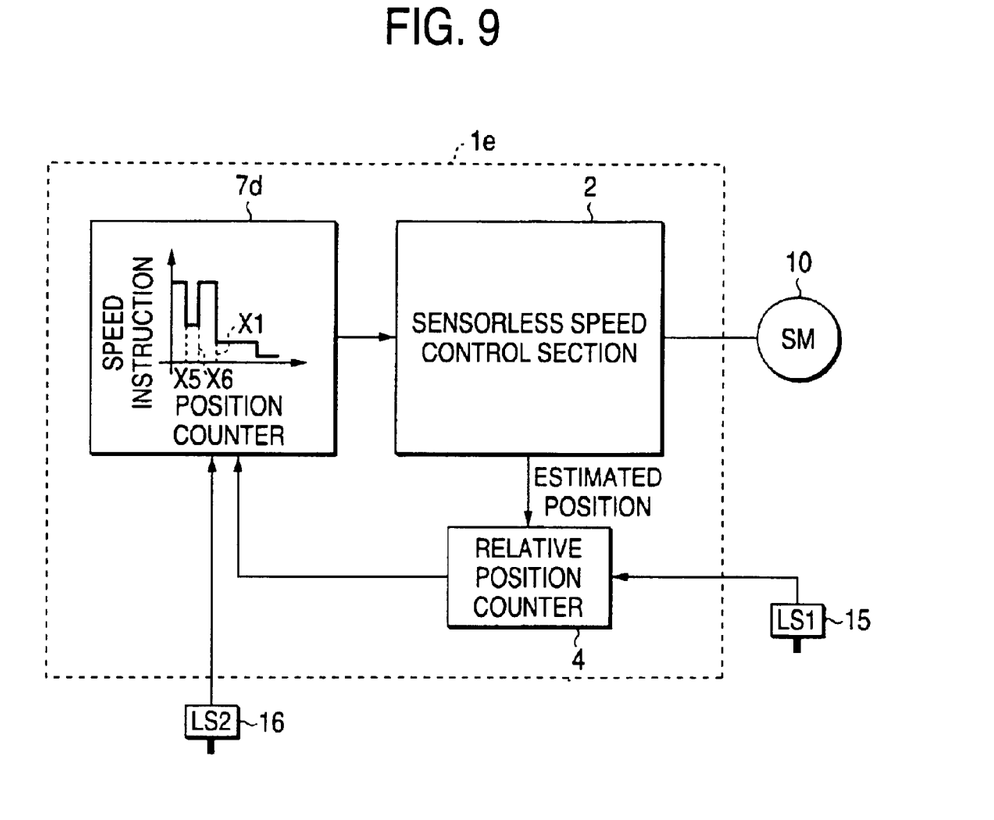
FIG. 9 is a view showing the configuration of a sensorless controller 1e of a synchronous motor according to a fifth embodiment of the invention.

FIG. 9 is a view showing the configuration of a sensorless controller 1e of a synchronous motor according to a fifth embodiment of the invention. In the drawing, reference numerals 2, 4, and 10 designate elements which are identical with those shown in FIG. 1, and their repeated explanations are omitted. Reference numeral 1e designates a sensorless controller of a synchronous motor; 7d designates a speed instruction generator for changing a speed instruction in accordance with an output from the relative position counter 4; 15 designates a limit switch which outputs a reference position signal to the relative position counter 4; and 16 designates a limit switch.

FIG. 10 is a view for describing the operation of the sensorless controller 1e of the synchronous motor of the fifth embodiment of the invention. FIG. 10A shows an example configuration of a transfer apparatus; 10B shows a speed instruction; FIG. 10C shows an output from the relative position counter 4; and 10D shows a speed. In the drawing, reference numerals 10 through 13 and 14a designate elements which are identical with those shown in FIG. 4, and their repeated explanations are omitted. Reference numeral 1e designates a sensorless controller of a synchronous motor; and 15, 16 designate limit switches. Reference symbol $f_L$ denotes a low rotational speed instruction; $f_M$ denotes a speed instruction for temporarily rendering a rotational speed lower than that achieved by a high rotational speed instruction; and $f_H$ denotes a high rotational speed instruction.

Operation of the sensorless controller 1d of the synchronous motor according to the fifth embodiment will now be described by reference to FIGS. 9 and 10.

Figure 10A:
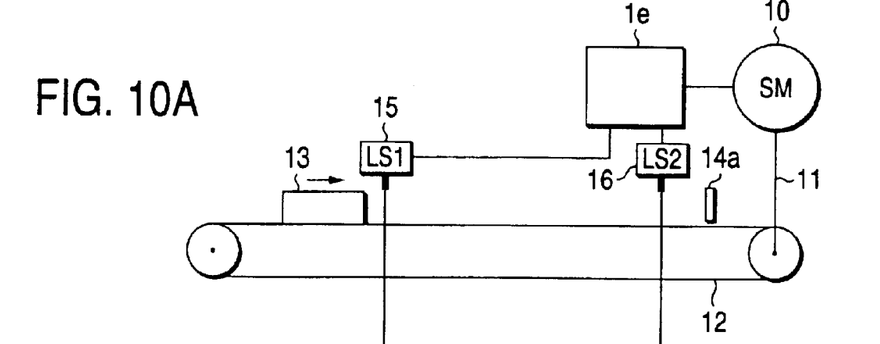
FIG. 10 is a view for describing the operation of the sensorless controller 1e of the synchronous motor of the fifth embodiment of the invention.
Figure 10B:
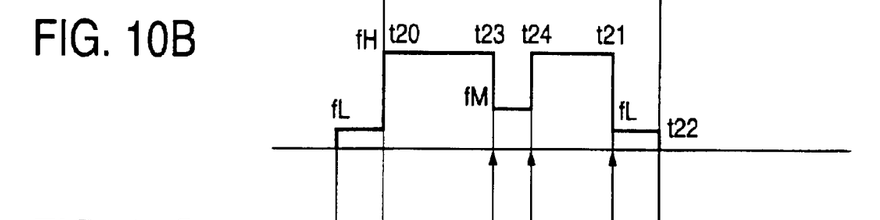
Figure 10C:
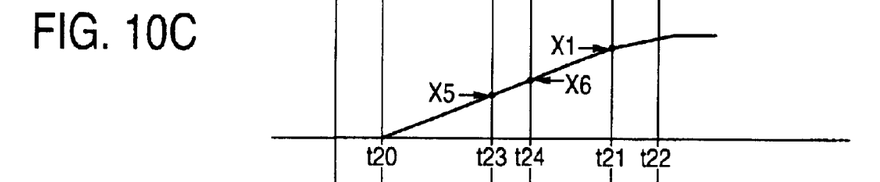
Figure 10D:
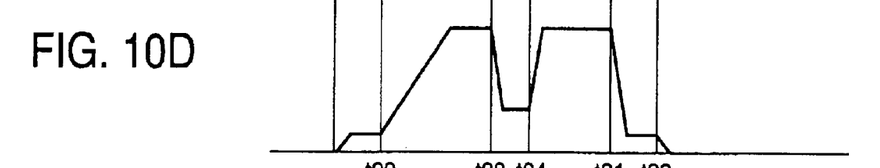

When the synchronous motor is started up, the object 13 is moved rightward from the left end of FIG. 10A in accordance with a low rotational speed instruction $f_L$.

At a point in time (t20) when the object 13 passes by the limit switch 15 during low speed operation before acceleration, the relative position counter 4 is reset, thereby starting counting operation. Moreover, at the point in time (t20) when the object 13 passes by the limit switch 15, the speed instruction generator 7d switches the instruction to a high speed instruction $f_H$.

When the value counted by the relative position counter 4 has reached an amount of movement X5 during high speed operation (t23), the speed instruction generator 7d temporarily switches the speed instruction to the low speed instruction $f_M$.

When the value counted by the relative position counter 4 has reached an amount of movement X6 during low speed operation (t24), the speed instruction generator 7d switches the speed instruction to the high speed instruction $f_H$.

When the value counted by the relative position counter 4 has reached the amount of movement X1 during high speed operation (t21), the speed instruction generator 7d switches the speed instruction to the low speed instruction $f_L$.

Deceleration is commenced, and at a point in time (t22) when the object passes by the limit switch 16 while traveling at a predetermined low rotational speed, stop operation is started.

The fifth embodiment is arranged so as to enable setting of the operation change relative positions X5, X6. When the object 13 has reached the previously-set operation change relative position X5, the speed instruction is temporarily decreased. When the object 13 has reached the previously-set operation change relative position X6, the speed is again increased. Hence, when the sensorless controller is used in conjunction with an operation pattern with a speed range including mechanical resonance or in conjunction with an operation pattern requiring an inspection during the course of operation, a region including mechanical resonance and a region corresponding to a period of inspection are specified by X5, X6, whereby the object can be caused to pass at low speed or actuated at a low speed which enables inspection.

Industrial Applicability

As mentioned above, a sensorless controller of a synchronous motor according to the invention enables positioning, at a predetermined location, of a synchronous motor not having a position sensor. Therefore, the sensorless controller is suitable for use with all types of motors, such as a brushless DC motor, an implanted magnet synchronous motor (IPM), a switched reluctance motor (SRM), and a synchronous reluctance motor (SyRM), in applications in which positioning is performed without use of a position sensor.

What is claimed is:

1. A synchronous motor sensorless controller which includes a current sensor for detecting an electric current of a synchronous motor, a position-and-speed estimation device for computing an estimated speed of the synchronous motor and an estimated position of a magnetic pole through use of the current output from the current sensor, and a speed controller for controlling speed of the synchronous motor through use of a speed instruction and the estimated speed; and which drives the synchronous motor without use of a rotational position sensor, the controller comprising:

reference position signal output means for outputting a reference position signal serving as a standard for positioning counting operation;

a relative position counter which acquires an estimated position of a magnetic pole from the position-and-speed estimation device as a reference position simultaneously with resetting a summated value to zero when the reference position signal is input and which starts summation operation; and a speed instruction generator having a position controller which performs position control operation on the basis of a deviation between an instruction value pertaining to the amount of movement from the reference position and a summated value output as a relative position from the relative position counter, the speed instruction generator outputting a speed instruction, wherein the speed instruction generator enables setting of a deceleration start position and a stop operation start position, starts deceleration operation when a summated value output from the relative position counter as a relative position has reached the deceleration start position, and starts stop operation when the summated value has reached the stop operation start position.

2. The synchronous motor sensorless controller according to claim 1, wherein the speed instruction generator can set at least two pairs, each pair formed from a deceleration start position and a stop operation start position, enables selection of one to be used during operation from the deceleration start position and the stop operation start position, starts deceleration when a summated value output from the relative position counter as a relative position has reached a selected deceleration start position, and starts stop operation when the summated value has reached a selected stop operation start position.

3. A synchronous motor sensorless controller which includes a current sensor for detecting an electric current of a synchronous motor, a position-and-speed estimation device for computing an estimated speed of the synchronous motor and an estimated position of a magnetic pole through use of the current output from the current sensor, and a speed controller for controlling speed of the synchronous motor through use of a speed instruction and the estimated speed; and which drives the synchronous motor without use of a rotational position sensor, the controller comprising:

reference position signal output means for outputting a reference position signal serving as a standard for positioning counting operation;

a relative position counter which acquires an estimated position of a magnetic pole from the position-and-speed estimation device simultaneously with resetting a summated value to zero when the reference position signal is input and which starts summation operation;

stop operation start position signal output means for outputting a stop operation start position signal; and a speed instruction generator having a position controller which performs position control operation on the basis of a deviation between an instruction value pertaining to the amount of movement from the reference position and a summated value output as a relative position from the relative position counter, the generator outputting a speed instruction, wherein the speed instruction generator enables setting of a changed speed instruction and a deceleration start position, changes a speed instruction to the changed speed instruction when a reference position signal is input, starts deceleration operation when a summated value outputted from the relative position counter as a relative position has reached the deceleration start position, and starts stop operation when a stop operation start position signal is outputted from the stop operation start position signal output means.

4. The synchronous motor sensorless controller according to claim 3, wherein the speed instruction generator enables setting of a first changed speed instruction, setting of a second changed speed instruction, setting of a first operation change relative position, setting of a second operation change relative position, and setting a deceleration start position;

changes a speed instruction to the first changed speed instruction when the reference position signal is input;

changes the speed instruction to the second changed speed instruction when the summated value output from the relative position counter as a relative position has reached the first operation change relative position;

changes the speed instruction to the first changed speed instruction when the summated value has reached the second operation change relative position; starts deceleration when a summated value output from the relative position counter as a relative position has reached the deceleration start position; and starts stop operation when a stop operation start position signal is output from the stop operation start position signal output means.

* * * * *